Patented Oct. 21, 1952

2,615,038

UNITED STATES PATENT OFFICE 2,615,038

O,O-DI(POLYHALOPHENYL) N-SUBSTITUTED AMIDOTHIOPHOSPHATES

Clarence L. Moyle, Clare, Mich., assignor to The Dow Chemical Company, Midland, Mich., a corporation of Delaware No Drawing. Application October 15, 1948, Serial No. 54,833

6 Claims. (Cl. 260—461)

This invention is directed to O,O-di(polyhalophenyl) N-substituted amidothiophosphates having the formula

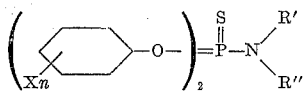

wherein each X represents bromine or chlorine, n is an integer from 3 to 5, inclusive, R' represents hydrogen or an alkyl or cycloalkyl radical, and R'' represents a cycloalkyl or alkyl radical.

In one method of preparing the new amidothiophosphate products, an alkali metal polyhalophenolate is reacted with an N-substituted dichlorothiophosphoramide having the formula

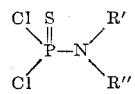

wherein R' and R'' are defined above. The reaction may be carried out in an inert organic solvent, and conveniently in a lower alkyl alcohol. For example, sodium polyhalophenolate may be prepared by reacting 1 molecular proportion of sodium with 1 molecular proportion of a polyhalophenol in methyl alcohols as reaction solvent. The resulting phenolate solution is then added portionwise over a short period of time to a one-half molecular proportion of the N-substituted dichlorothiophosphoramide. The addition is carried out at a temperature of from 30° to 110° C. and the reaction mixture thereafter warmed within this temperature range for a short time to complete the reaction. The reaction is exothermic, the temperature being controlled by regulation of the rate of addition of the polyhalophenolate and by the addition and subtraction of heat, if required.

Following the reaction, the solvent is removed from the crude mixture by evaporation and the residue dispersed in a non-reactive water-immiscible organic solvent such as benzene, carbon tetrachloride or methylene dichloride. This solvent mixture may be successively washed with dilute aqueous sodium or ammonium hydroxide and water, and dried with anhydrous sodium sulphate. The desired product is then separated by evaporation of the solvent.

In an alternative procedure, the N-substituted dichlorothiophosphoramide is added portionwise to the solvent solution of the alkali metal phenolate. The conditions of reaction are essentially as previously described.

The N-substituted dichlorothiophosphoramides employed as starting materials can be prepared by reacting a monoalkyl, monocycloalkyl, dicycloalkyl, dialkyl or N-alkyl cycloalkylamine with an excess of thiophosphoryl chloride ($PSCl_3$). Satisfactory yields are obtained in preparations employing from 1 to 4 molecular proportions of thiophosphoryl chloride per molecular proportion of amine salt. The reaction takes place at a temperature of from 10° to 80° C. Following the reaction, the mixture is filtered and the filtrate distilled under reduced pressure to obtain the N-substituted dichlorothiophosphoramide.

The following examples illustrate the invention but are not to be construed as limiting.

*Example 1.—O,O-di(2,4,5-trichlorophenyl) N,N-dimethylamidothiophosphate*

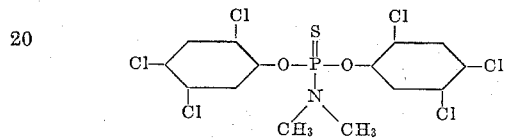

5.6 grams (0.1 mol) of potassium hydroxide was reacted with 20.2 grams (0.1 mol) of 2,4,5-trichlorophenol in methyl alcohol to form a solution of the phenolate. This product was added portionwise over a period of 5 minutes to 8.9 grams (0.05 mol) of N,N-dimethyl dichlorothiophosphoramide. The temperature was maintained at 50° to 60° C. during the addition and the mixture thereafter warmed for 15 minutes at the boiling temperature and under reflux to complete the reaction. The methyl alcohol was removed by evaporation and the residue dispersed in methylene dichloride. This solvent mixture was successively washed with dilute aqueous ammonium hydroxide and water, and dried with anhydrous sodium sulphate. The methylene dichloride was then removed by evaporation to obtain an O,O-di(2,4,5-trichlorophenyl) N,N-dimethylamidothiophosphate product as an orange oil having a density of 1.35 at 31° C. and a refractive index $n/D$ of 1.5737 at 35° C.

*Example 2.—O,O-di(4-bromo-2,6-dichlorophenyl) N-isopropylamidothiophosphate*

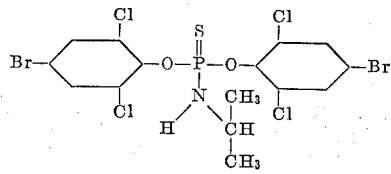

2.3 grams (0.1 mol) of sodium and 24.2 grams (0.1 mol) of 4-bromo-2,6-dichlorophenol were reacted in 55 grams of ethyl alcohol to form an alcoholic phenolate solution. This solution was added portionwise over a period of 4 minutes to 9.6 grams (0.05 mol) of N-isopropyl dichlorothiophosphoramide. The temperature was maintained at 50° to 55° C. during the addition and the resulting mixture warmed for 5 minutes at the boiling temperature and under reflux to complete the reaction. The crude mixture was then dispersed in methylene dichloride. This solvent mixture was successively washed with dilute aqueous ammonium hydroxide and water, and dried with anhydrous sodium sulphate. The solvent was then removed by evaporation to obtain an O,O-di(4-bromo-2,6-dichlorophenyl) N-isopropylamidothiophosphate product as a yellow oil having a density of 1.23 at 30° C. and a refractive index n/D of 1.5103 at 35° C.

*Example 3.—O,O-di(2,3,4,6-tetrachlorophenyl) N-ethylamidothiophosphate*

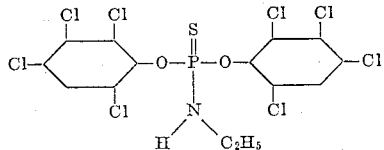

2.3 grams (0.1 mol) of sodium was reacted with 23.2 grams (0.1 mol) of 2,3,4,6-tetrachlorophenol in 79.8 grams of methyl alcohol. This alcoholic phenolate solution was added portionwise over a period of 4 minutes to 8.9 grams (0.05 mol) of N-ethyl dichlorothiophosphoramide. The resulting mixture was warmed for 10 minutes at the boiling temperature to complete the reaction. The methyl alcohol was removed by evaporation and the residue dispersed in methylene dichloride. This mixture was successively washed with dilute aqueous sodium hydroxide and water, and dried with anhydrous sodium sulphate. The methylene dichloride was then removed by evaporation to obtain an O,O-di(2,3,4,6-tetrachlorophenyl) N-ethylamidothiophosphate product as a brown oil. The latter had a density of 1.22 at 30° C. and a refractive index n/D of 1.5608 at 35° C.

*Example 4.—O,O-di(pentachlorophenyl) N-ethylamidothiophosphate*

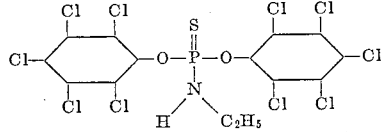

5.6 grams (0.1 mol) of potassium hydroxide and 26.7 grams (0.1 mol) of pentachlorophenol were reacted in methyl alcohol. This product was added portionwise to 8.9 grams (0.05 mol) of N-ethyl dichlorothiophosphoramide and the resulting product thereafter warmed at 40° to 70° C. to complete the reaction. The separation was carried out as described in Example 3 to obtain an O,O-di(pentachlorophenyl) N-ethylamidothiophosphate product as a brown oil having a density of 1.36 at 30° C. and a refractive index n/D of 1.5536 at 35° C.

*Example 5.—O,O-di(2,4,6-trichlorophenyl) N-normalamylamidothiophosphate*

3.22 grams (0.14 mol) of sodium was reacted with 27.6 grams (0.14 mol) of 2,4,6-trichlorophenol in ethyl alcohol. 15.4 grams (0.07 mol) of N-normalamyl dichlorothiophosphoramide was added portionwise to the above solution over a period of 3 minutes. The temperature rose to 64° C. during the addition and was thereafter brought to 70° to 77° C. for 5 minutes to complete the reaction. The ethyl alcohol was removed by evaporation and the residue dispersed in methylene dichloride. This mixture was successively washed with dilute aqueous sodium hydroxide, dilute aqueous hydrochloric acid and water, and dried with anhydrous sodium sulphate. The methylene dichloride was then removed by evaporation to obtain an O,O-di(2,4,6-trichlorophenyl) N - normalamylamidothiophosphate product as an orange oil having a density of 1.07 at 31° C. and a refractive index n/D of 1.4956 at 36° C.

*Example 6.—O,O-di(2,4,5-trichlorophenyl) N-cyclohexylamidothiophosphate*

39.6 grams (0.4 mol) of cyclohexyl amine was reacted with 33.9 grams (0.2 mol) of thiophosphoryl chloride in diethyl ether to produce a solvent solution of N-cyclohexyl dichlorothiophosphoramide. In this preparation, the cylohexyl amine was first dissolved in 100 milliliters of diethyl ether and this solution added portionwise over a period of 5 minutes to the thiophosphoryl chloride dissolved in 100 milliliters of the same solvent. The resulting mixture was warmed at its boiling temperature and under reflux for 5 minutes, cooled to room temperature, filtered and the filtrate concentrated by evaporation to a volume of 250 milliliters. 3.22 grams (0.14 mol) of sodium was then reacted with 27.6 grams (0.14 mol) of 2,4,5-trichlorophenol in methyl alcohol and this alcoholic phenolate added portionwise over a period of 5 minutes to one-third of the above prepared N-cyclohexyl dichlorothiophosphoramide solution. The mixture was allowed to stand for several hours to complete the reaction. The ether and methyl alcohol were then removed by evaporation and the residue dispersed in methylene dichloride. The separation was carried out as described in Example 5 to obtain an O,O-di(2,4,5-trichlorophenyl) N-cyclohexylamidothiophosphate product as a crystalline solid melting at 66° to 72° C.

In a similar manner, other O,O-di(polyhalophenoxy) N-substituted amidothiophosphates may be prepared as follows:

O,O - di(pentachlorophenyl) N - normaloctylamidothiophosphate by reacting sodium pentachlorophenolate with N-normaloctyl dichlorothiophosphoramide.

O,O - di(2,4,6 - tribromophenyl) N - (4 - phenylcyclohexyl) - amidothiophosphate by reacting sodium 2,4,5 - tribromophenolate with N - (4-phenylcyclohexyl) dichlorothiophosphoramide.

O,O - di(2,3,4,6 - tetrachlorophenyl) N,N - disecondary-butylamidothiophosphate by reacting sodium 2,3,4,6-tetrachlorophenolate with N,N,-disecondarybutyl dichlorothiophosphoramide.

O,O-di(2,4,6-trichlorophenyl) N,N-dicyclohexylamidothiophosphate by reacting sodium 2,4,6-trichlorophenolate with N,N-dicyclohexyl dichlorothiophosphoramide.

O,O-di(pentachlorophenyl) N-(2,4-dimethylcyclohexyl)-amidothiophosphate by reacting sodium pentachlorophenolate with N-(2,4-dimethylcyclohexyl) dichlorothiophosphoramide.

O,O-di(2,4,6-trichlorophenyl) N-normaldodecylamidothiophosphate by reacting sodium 2,4,6-trichlorophenolate with N-normaldodecyl dichlorothiophosphoramide.

O,O-di(2,3,4,6-tetrachlorophenyl) N-(4-methylcyclohexyl) amidothiophosphate by reacting sodium 2,3,4,6-tetrachlorophenolate with N-(4-methylcyclohexyl) dichlorothiophosphoramide.

O,O-di(2,4,5-tribromophenyl) N-methyl N-cyclohexylamidothiophosphate by reacting sodium 2,4,5-tribromophenolate with N-methyl-N-cyclohexyl dichlorothiophosphoramide.

Further details on the preparation of the N-cyclohexyl dichlorothiophosphoramide employed as a starting material in Example 6, are set forth in a copending application, Serial No. 54,831, filed concurrently herewith. This compound is a white crystalline solid having a freezing point of 70° C. and a boiling point of 135° to 143° C. at 4 millimeters pressure.

These new amidothiophosphate products are oily liquids or crystalline solids somewhat soluble in many organic solvents, substantially insoluble in water, stable to light and air and non-corrosive to the skin of man and higher animals. They are adapted to be employed as modifying agents in plastic compositions, as intermediates for the preparation of more complex organic derivatives, as constituents of extreme pressure lubricants and as constituents of insecticide and fungicide compositions.

To demonstrate their toxicity, the new products were tested for the control of two-spotted spider mite, bean aphid and Mexican bean beetle. Against these organisms, 100 per cent controls have been obtained with from 0.5 to 3 pounds of the toxicant per 100 gallons of spray mixture. By such expression, applicant means that against one or more of the named organisms, complete controls have been obtained with each toxicant when employed in aqueous spray compositions at a concentration within the range of from 0.5 to 3 pounds of toxicant per 100 gallons of spray mixture. Such spray mixtures have contained the new products in combination with representative wetting and emulsifying agents. When employed for the control of American roach nymph, milkweed bug, confused flour beetle and black carpet beetle, 100 per cent kills have been obtained in 48 hours by allowing the insects to feed upon white flour containing 1 per cent by weight of many of the toxicants.

I claim:

1. An amidothiophosphate having the formula

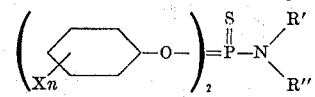

wherein each X represents halogen of the group consisting of bromine and chlorine, $n$ is an integer from 3 to 5, inclusive, R' represents a member of the group consisting of hydrogen and the alkyl and cycloalkyl radicals and R'' represents a member of the group consisting of the cycloalkyl and alkyl radicals.

2. O,O-di(2,4,5-trichlorophenyl) N,N-dimethylamidothiophosphate.

3. O,O-di(pentachlorophenyl) N-ethylamidothiophosphate.

4. O,O-di(2,4,5-trichlorophenyl) N-cyclohexylamidothiophosphate.

5. O,O-di(4-bromo-2,6-dichlorophenyl) N-isopropylamidothiophosphate.

6. O,O-di(2,3,4,6-tetrachlorophenyl) N-ethylamidothiophosphate.

CLARENCE L. MOYLE.

REFERENCES CITED

The following references are of record in the file of this patent:

UNITED STATES PATENTS

| Number | Name | Date |
| --- | --- | --- |
| 2,146,584 | Lipkin | Feb. 7, 1939 |
| 2,302,805 | Schussler | Nov. 24, 1942 |

FOREIGN PATENTS

| Number | Country | Date |
| --- | --- | --- |
| 500,386 | Great Britain | Feb. 8, 1939 |

REFERENCES CITED

Autenrieth et al.: "Ber. deutsch. chem. Ges.," vol. 31 (1898), pp. 1097–1099.